US007842155B1

(12) United States Patent
Cowan

(10) Patent No.: US 7,842,155 B1

(45) Date of Patent: Nov. 30, 2010

(54) PROCESS FOR MAKING A POST-ASSEMBLY MARKABLE LABEL

(76) Inventor: Randy Cowan, 3004 W. Wayne Dr., Sioux Falls, SD (US) 57105

(*) Notice: Subject to any disclaimer, the term of this patent is extended or adjusted under 35 U.S.C. 154(b) by 236 days.

(21) Appl. No.: 12/218,631

(22) Filed: Jul. 17, 2008

(51) Int. Cl.
*B29C 65/00* (2006.01)
*B31D 1/02* (2006.01)
*B32B 37/00* (2006.01)
*B32B 38/10* (2006.01)
*B32B 38/04* (2006.01)

(52) U.S. Cl. ........................ 156/248; 156/247; 156/268; 156/250; 156/251; 156/257; 156/260; 156/263; 156/265; 156/266; 156/258

(58) Field of Classification Search ......... 156/247–248, 156/250–251, 257–258, 268, 260, 263, 265–266
See application file for complete search history.

(56) References Cited

U.S. PATENT DOCUMENTS

| | | | |
|---|---|---|---|
| 3,971,866 | A | 7/1976 | Johnson |
| 4,609,589 | A | 9/1986 | Hosoda et al. |
| 4,621,837 | A | 11/1986 | Mack |
| 4,930,812 | A | 6/1990 | Howard |
| 4,991,878 | A | 2/1991 | Cowan et al. |
| 5,021,273 | A | 6/1991 | Kobayashi |
| 5,074,595 | A | 12/1991 | Hill et al. |
| D327,709 | S | 7/1992 | Hagen |
| 5,154,956 | A | 10/1992 | Fradrich |
| 5,200,243 | A | 4/1993 | Van Veen |
| 5,234,735 | A | 8/1993 | Baker et al. |
| 5,263,743 | A | 11/1993 | Jones |
| 5,290,616 | A | 3/1994 | Cowan et al. |
| 5,324,559 | A | 6/1994 | Brombacher |
| 5,399,403 | A | 3/1995 | Instance |
| 5,403,636 | A | 4/1995 | Crum |
| 5,439,721 | A | 8/1995 | Pedroli et al. |
| 5,507,901 | A | 4/1996 | Limina et al. |
| 5,587,222 | A | 12/1996 | Hoffmann |
| 5,588,239 | A | 12/1996 | Anderson |

(Continued)

FOREIGN PATENT DOCUMENTS

| | | |
|---|---|---|
| EP | 0506202 | 9/1992 |

(Continued)

*Primary Examiner*—Khanh Nguyen
*Assistant Examiner*—Matthew Hoover
(74) *Attorney, Agent, or Firm*—Jeffrey A. Proehl; Woods, Fuller, Shultz & Smith, PC

(57) ABSTRACT

A method of producing a laminated label structure that includes a region that is markable after assembly of the label structure is disclosed. The method comprises providing a strip of base material having a front face, applying a release material to a markable region of the front face for being marked after assembly of the label structure, and cutting the base material to form a first portion of a perimeter of the label structure. The method further comprises positioning a laminate material over a portion of the front face including the markable region, cutting the base material and the laminate material to form a second portion of the perimeter, cutting the laminate material substantially along a margin of the markable region without severing the base material; and peeling away from the base material a portion of the laminate material overlying the markable region of the front face.

20 Claims, 12 Drawing Sheets

U.S. PATENT DOCUMENTS

| | | | |
|---|---|---|---|
| 5,674,334 | A | 10/1997 | Instance |
| 5,736,212 | A | 4/1998 | Fischer |
| 5,738,382 | A | 4/1998 | Grosskopf et al. |
| 5,804,271 | A | 9/1998 | Barry |
| 5,863,628 | A | 1/1999 | Barry |
| 5,866,219 | A | 2/1999 | McClure et al. |
| 5,951,054 | A | 9/1999 | Hagen et al. |
| 5,972,455 | A | 10/1999 | Barry |
| 6,027,598 | A | 2/2000 | Anderson |
| 6,027,780 | A | 2/2000 | Treleaven et al. |
| 6,057,019 | A | 5/2000 | Barry |
| 6,120,637 | A | 9/2000 | Barry |
| 6,210,767 | B1 | 4/2001 | Knauf |
| 6,213,520 | B1 | 4/2001 | Treleaven et al. |
| 6,254,137 | B1 | 7/2001 | Baum et al. |
| 6,306,476 | B1 | 10/2001 | Barry |
| 6,329,034 | B1 | 12/2001 | Pendry et al. |
| 6,398,263 | B2 | 6/2002 | Treleaven et al. |
| 6,413,345 | B1 | 7/2002 | Treleaven |
| 6,432,500 | B1 | 8/2002 | Jones et al. |
| 6,439,614 | B1 | 8/2002 | Cowan |
| 6,447,862 | B1 | 9/2002 | Rankin et al. |
| 6,531,023 | B1 | 3/2003 | Barry |
| 6,541,090 | B2 | 4/2003 | Grosskopf et al. |
| 6,645,592 | B1 | 11/2003 | Cowan |
| 7,077,435 | B1 * | 7/2006 | Cowan ........................ 283/81 |
| 7,179,514 | B2 | 2/2007 | Olsen et al. |
| 2001/0004152 | A1 | 6/2001 | Treleaven et al. |
| 2001/0011821 | A1 | 8/2001 | Lind |
| 2006/0263594 | A1 * | 11/2006 | Kraft et al. .................. 428/343 |

FOREIGN PATENT DOCUMENTS

| | | |
|---|---|---|
| EP | 0833295 | 9/1997 |
| GB | 2220886 | 1/1990 |
| WO | WO 92/04704 | 3/1992 |
| WO | WO 98/07131 | 2/1998 |

* cited by examiner

PROCESS FOR MAKING A POST-ASSEMBLY MARKABLE LABEL

BACKGROUND OF THE INVENTION

1. Field of the Invention

The present invention relates to processes for forming label structures, and more particularly pertains to a new process for making a label structure that includes at least a portion that may be marked after the assembly of the label structure so that information may be marked on the label after the label has been assembled, and may be marked even after application to a product.

2. Description of the Prior Art

Labels are typically printed or otherwise marked with all required information during the process in which the label structure is assembled, which facilitates the protection of the printed matter by, for example, the application to the surface of the label stock of a laminating material or a protective coating after the surface has been marked with a material such as ink.

In many situations, however, a packager or the ultimate user of a label needs or desires to perform some additional marking or printing on a label after the label structure has been assembled by the label supplier and delivered to the packager. For example, a packager may need to add indicia to the label such as a lot number or expiration date to the label before or after the label is applied to the container for the product. This marking may be done using a thermal printer, a dot-matrix printer, a laser printer, and the like. Increasingly more popular, the laser of a laser printer, rather than depositing ink or other residue to the label, actually removes some previously applied ink from the surface of the label stock to reveal an area of the base material of the label stock, and thereby creates a marking on the label surface that contrasts with the ink on the surrounding area of the label surface.

As previously mentioned, it is common in the production of label structures to use an overlaminate layer or material over substantially the entirety of the base material of the label to provide protection for the label stock and the markings thereon. However, the laser printing technique does not satisfactorily work when the overlaminate layer is placed over the base material as the laser does not sufficiently penetrate through or remove material from the laminate layer, which is typically transparent in nature and does not take the application of ink. Therefore, if an overlaminate is to be applied to the label structure, the laminate layer has generally been selectively applied to areas of the label that do not need to be marked in a process after the label is assembled. This technique tends to be difficult to employ in the label structure forming process, as the laminate layer is typically formed of a strip of laminating material that is adhered to the face of the label structure, and forming holes in the laminate prior to adhering the laminate to the base material can be difficult.

Thus, it is believed that there remains a need for a simple and highly effective manner of producing a label structure that may be marked in a post-assembly process while still employing an overlaminate.

SUMMARY OF THE INVENTION

In view of the foregoing disadvantages inherent in the known types of methods of assembling a label structure known in the prior art, the present invention provides a new process for making a post-assembly markable label structure wherein the same can be utilized for making a label that may be marked after the assembly of the label structure so that information may be marked on the label after the label has been assembled, and may be marked even after application to a product.

To attain this, the present invention generally comprises a method of producing a laminated label structure that includes a region that is markable after assembly of the label structure. The method includes providing a strip of base material having a front face, applying a release material to a markable region of the front face of the strip of base material for being marked after assembly of the label structure, and cutting the base material to form a first portion of a perimeter of the label structure being formed. The method further includes positioning a laminate material over at least a portion of the front face of the base material including the markable region, cutting the base material and the laminate material to form a second portion of the perimeter of the label structure being formed, cutting the laminate material substantially along a margin of the markable region of the front face without severing the base material, and peeling away from the base material a portion of the laminate material overlying the markable region of the front face of the base material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant aspect of the present invention is the ability to produce a laminated label structure that is markable after it has been assembled.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 12 thereof, a new process for making a post-assembly markable label embodying the principles and concepts of the present invention will be described.

One aspect of the invention includes a method of producing a laminated label structure 10 that includes a region that is markable or printable after assembly of the label structure 10 has been accomplished.

Figure 1:
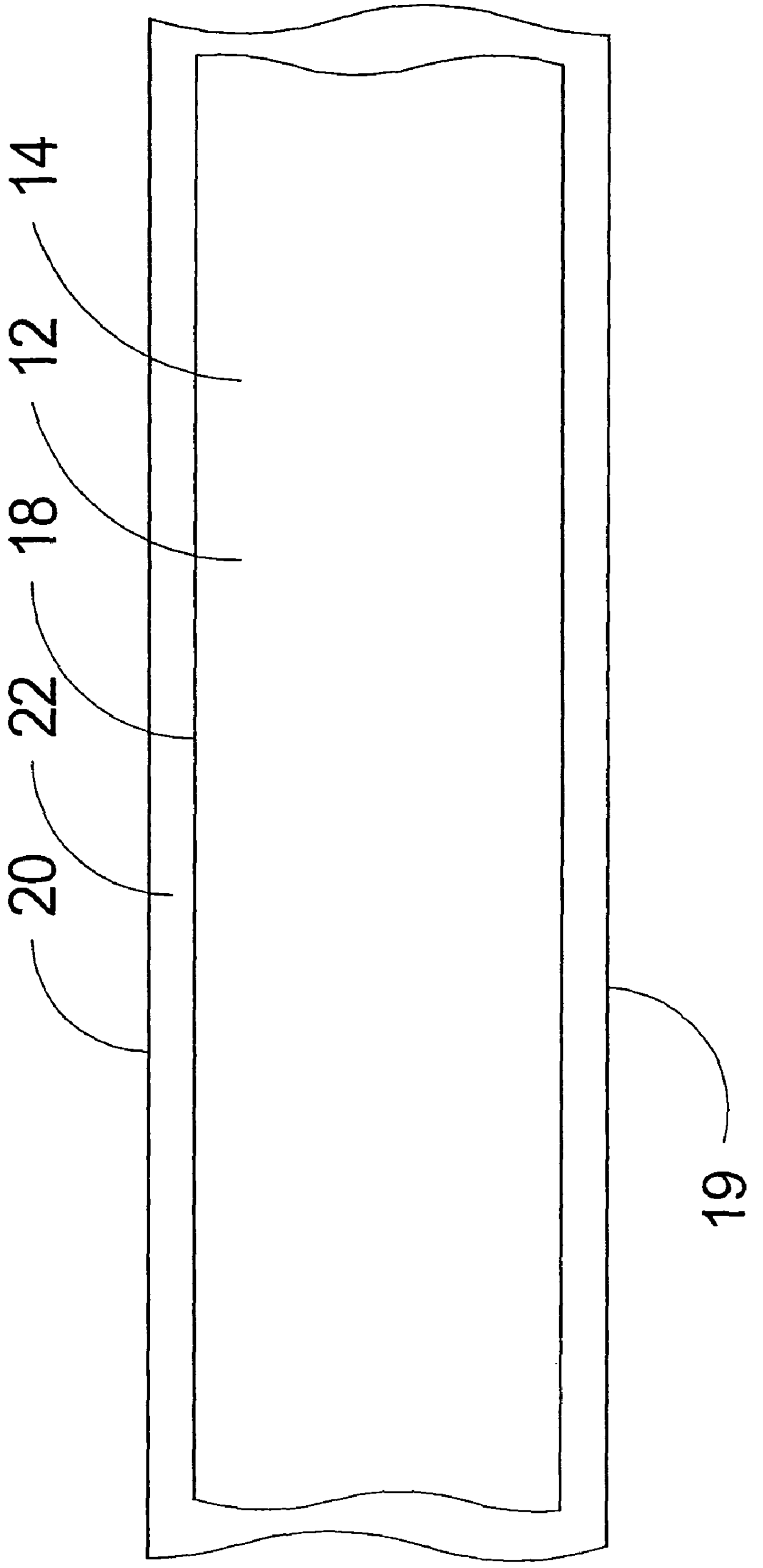
FIG. 1 is a schematic front view of an initial configuration of a label structure being formed by the new process for making a post-assembly markable label according to the present invention.

An initial aspect of the method may be to provide a strip of base material 12 for the label structure 10 (see, for example, FIG. 1). The strip of base material 12 may be elongated with a longitudinal axis, and in various embodiments of the invention the strip has a length of at least 10 meters. The base material 12 has a front face 14, a rear face 16 that is located opposite of the front face, and two side edges 18, 19 that extend longitudinally along the length of the base material 12. The base material 12 may comprise a paper material, although other suitable materials may be used to form the base material of the label structure 10.

Figure 12:
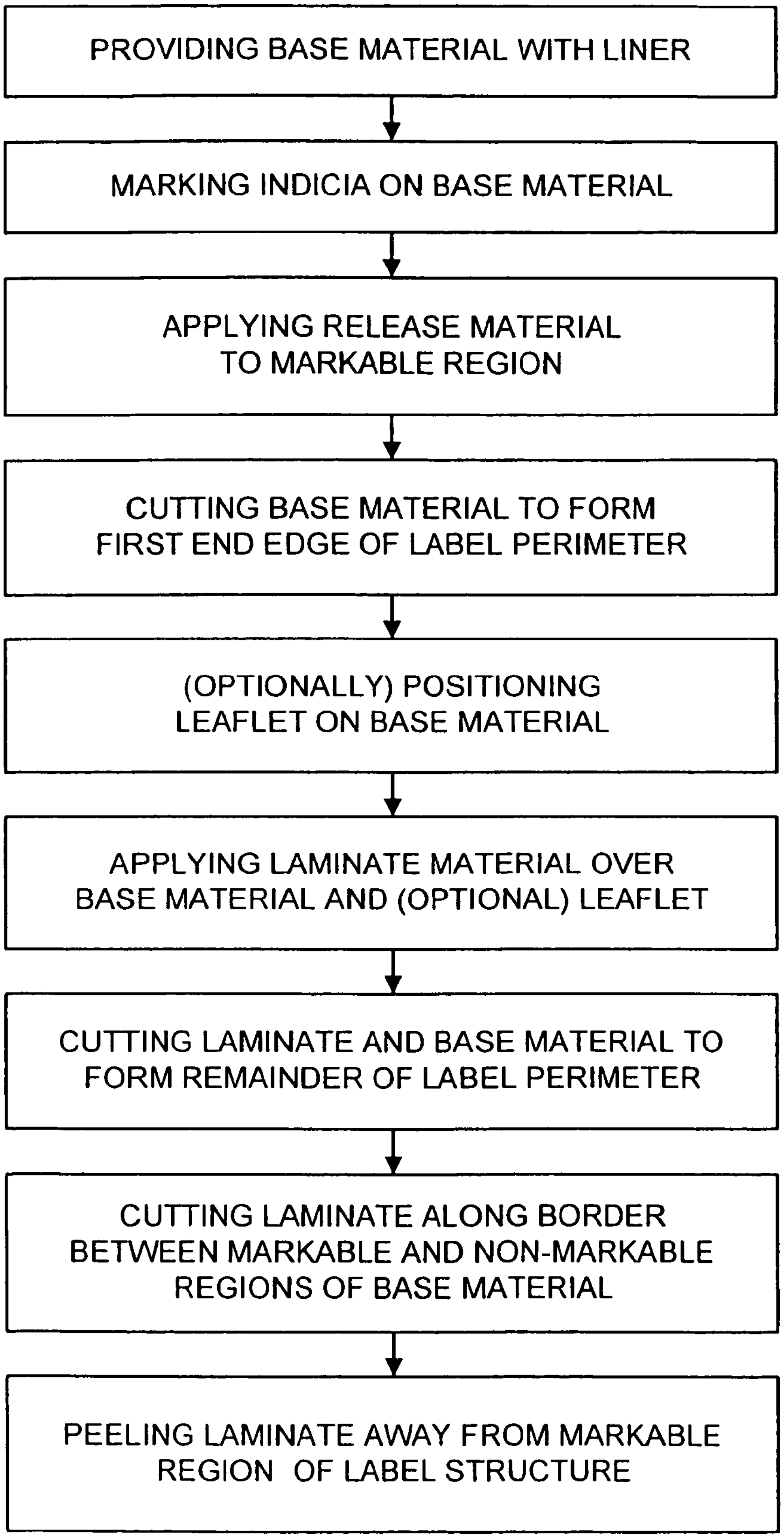
FIG. 12 is a flow diagram of selected aspects of the method of the present invention.

In various embodiments of the invention, a liner 20 is provided for the base material 12 (see FIG. 1), and the rear face 16 of the strip of base material is adhered or otherwise removably secured to a front surface 22 of the liner 20 (see FIG. 12). Illustratively, an adhesive permitting peeling of the base material 12 from the liner 20 is employed, such as, for example, a pressure sensitive adhesive. The liner 20 thus provides a web for carrying the strip of base material 12 prior to the forming of the label structure, and for carrying a series of the label structures 10 after the labels have been formed. While the liner 20 shown in the drawings is wider than the base material 12, it should be understood that the base material may be substantially the same width as the liner, and optionally base material may be coextensive with the liner.

Figure 2:
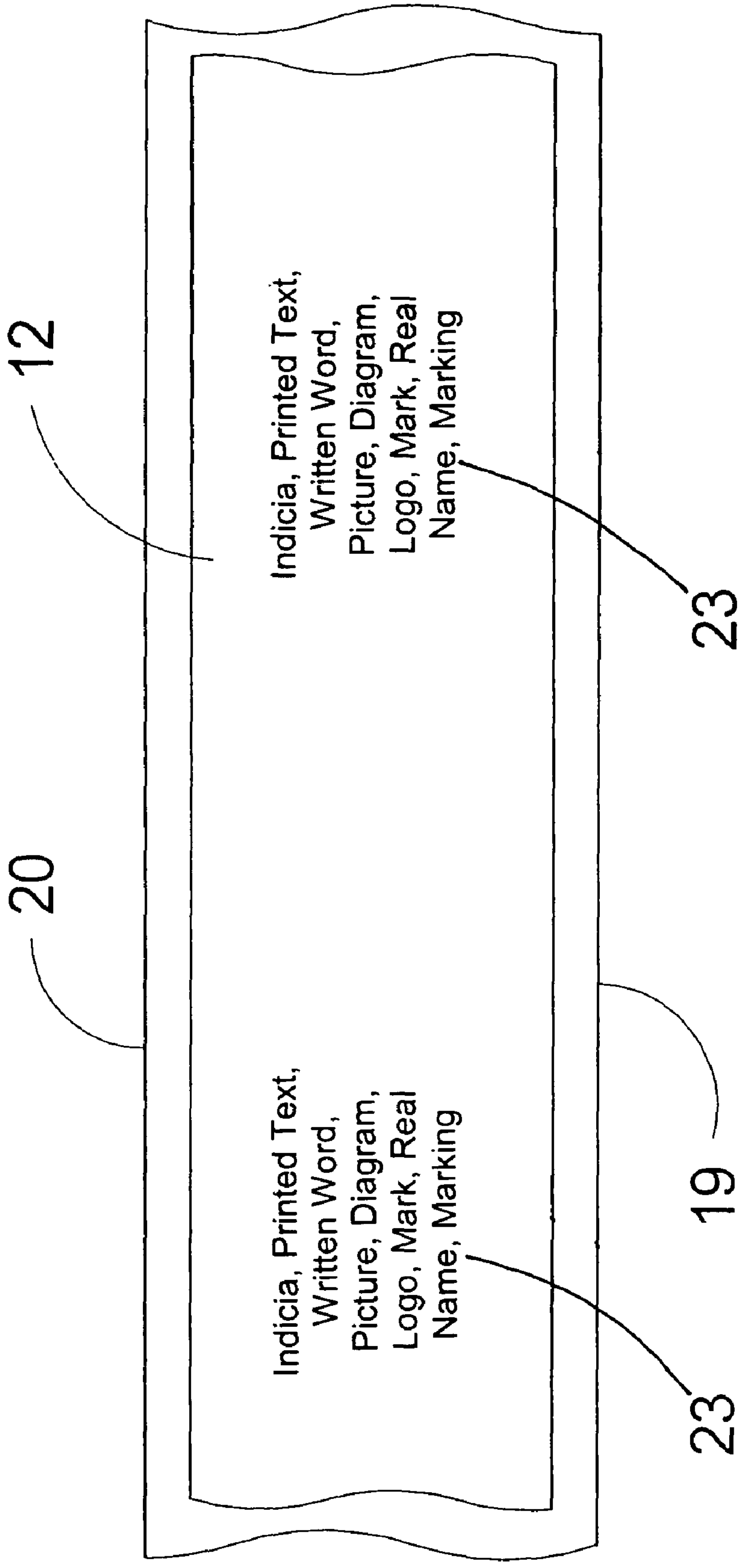
FIG. 2 is a schematic front view of a further configuration (relative to FIG. 1) of the label structure being formed according to the present invention.

Another aspect of the method may be to mark or print indicia 23 on the front face 14 of the strip of base material 12 (see FIG. 2). The marking may be accomplished in any heretofore known manner or manner developed in the future, and typically comprises printing on the front face using one or more inks. The indicia may be any manner of alpha numeric characters, symbols, illustrations, and the like.

Figure 3:
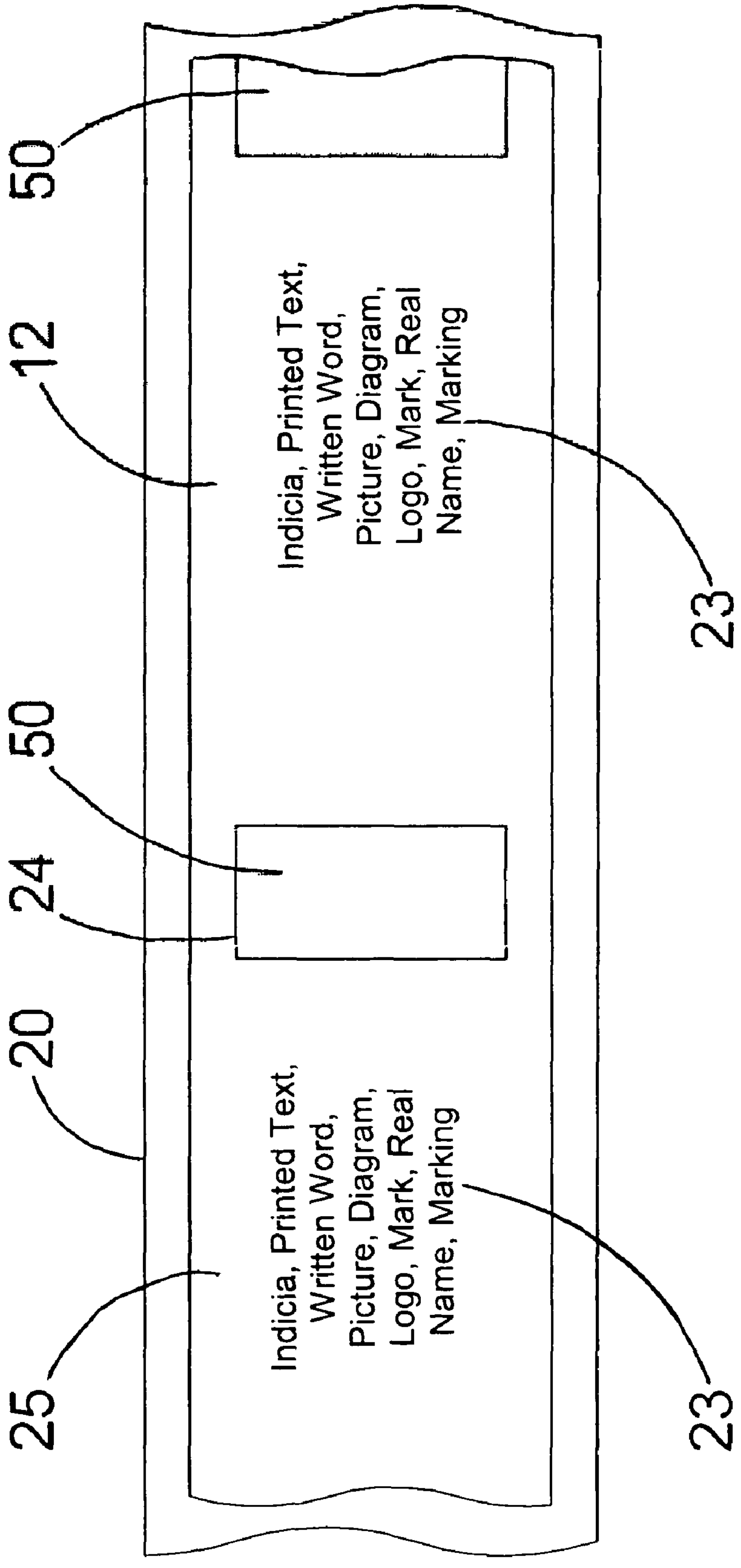
FIG. 3 is a schematic front view of a still further configuration (relative to FIG. 2) of the label structure being formed according to the present invention.

In a further aspect of the method, a release material 50 may be applied to a markable region 24 of the front face 14 of the strip of base material 12 (see FIG. 3). The markable region 24 generally corresponds to a portion of the front face 14 that is capable of being marked after assembly of the label structure 10, whether by means of ink, ink removal, heat, or any other suitable technique. It should be recognized that the markable region 24 may have been printed with an ink or other material prior to the application of the release material. The release material 50 should produce a surface with relatively low adherability may also be used on the markable region may comprise anything that produces a surface with such a character. For example, the release material 50 may comprise a surface treatment or a coating. The coating may comprise a release lacquer, a varnish, a silicone, or even an ink having easy release characteristics, although the release material is not limited to these possibilities.

A non-markable region 25 of the front face 14 of the base material 12 may thus be defined as the region of the front face 14 that does not include the markable region 24 (see FIG. 3). It should be recognized that the terminology "non-markable" is not intended to indicate that the region 25 is incapable of being marked, only that the region 25 is not as easily marked upon as the markable region, particularly by use of a laser. As will become apparent as this description proceeds, the non-markable region 25 of the front face 14 includes areas of the label structure 10 that are covered by an overlaminate, or are obstructed by the presence of a leaflet, in the final form of the label structure.

Figure 4:
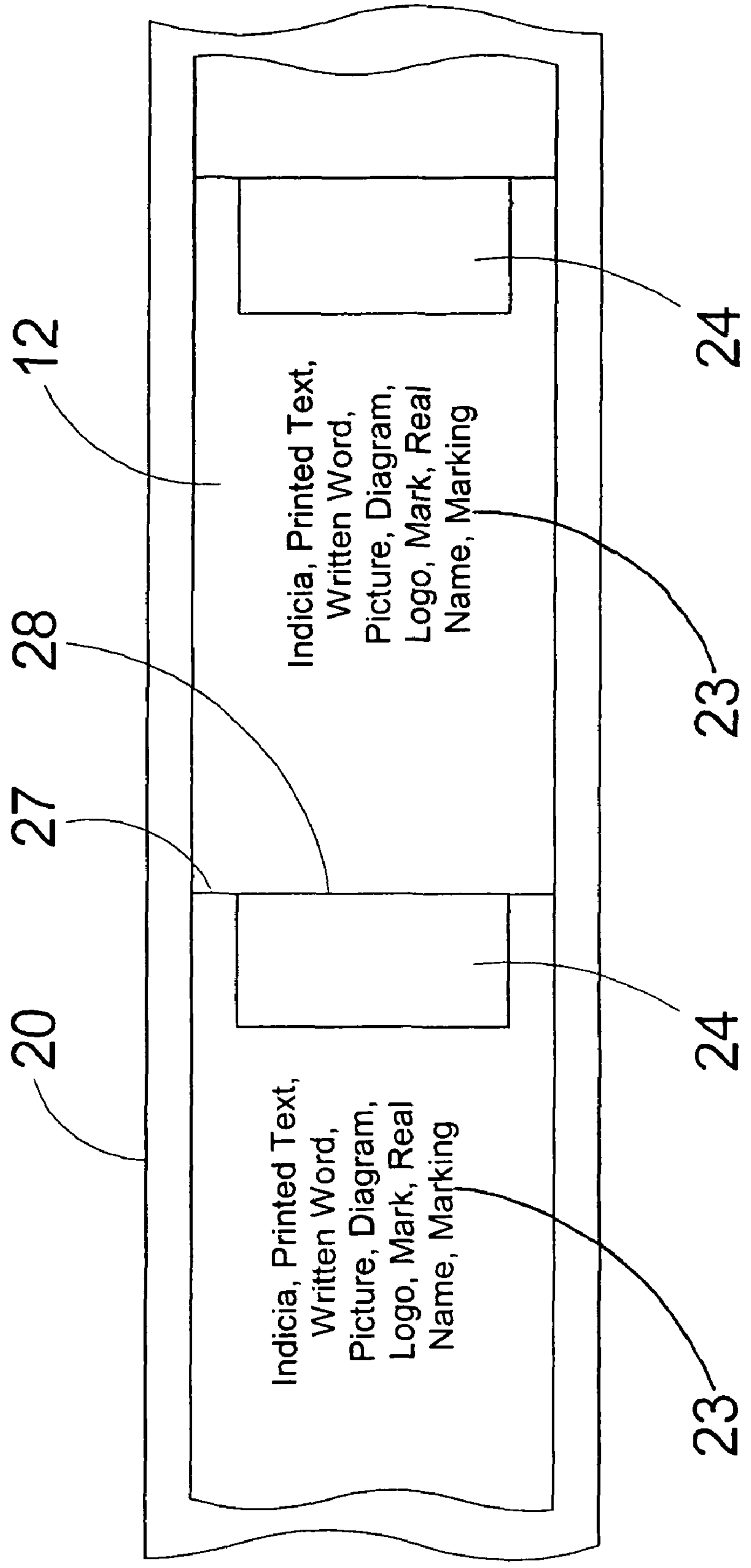
FIG. 4 is a schematic front view of a yet further configuration (relative to FIG. 3) of the label structure being formed according to the present invention.
Figure 5:
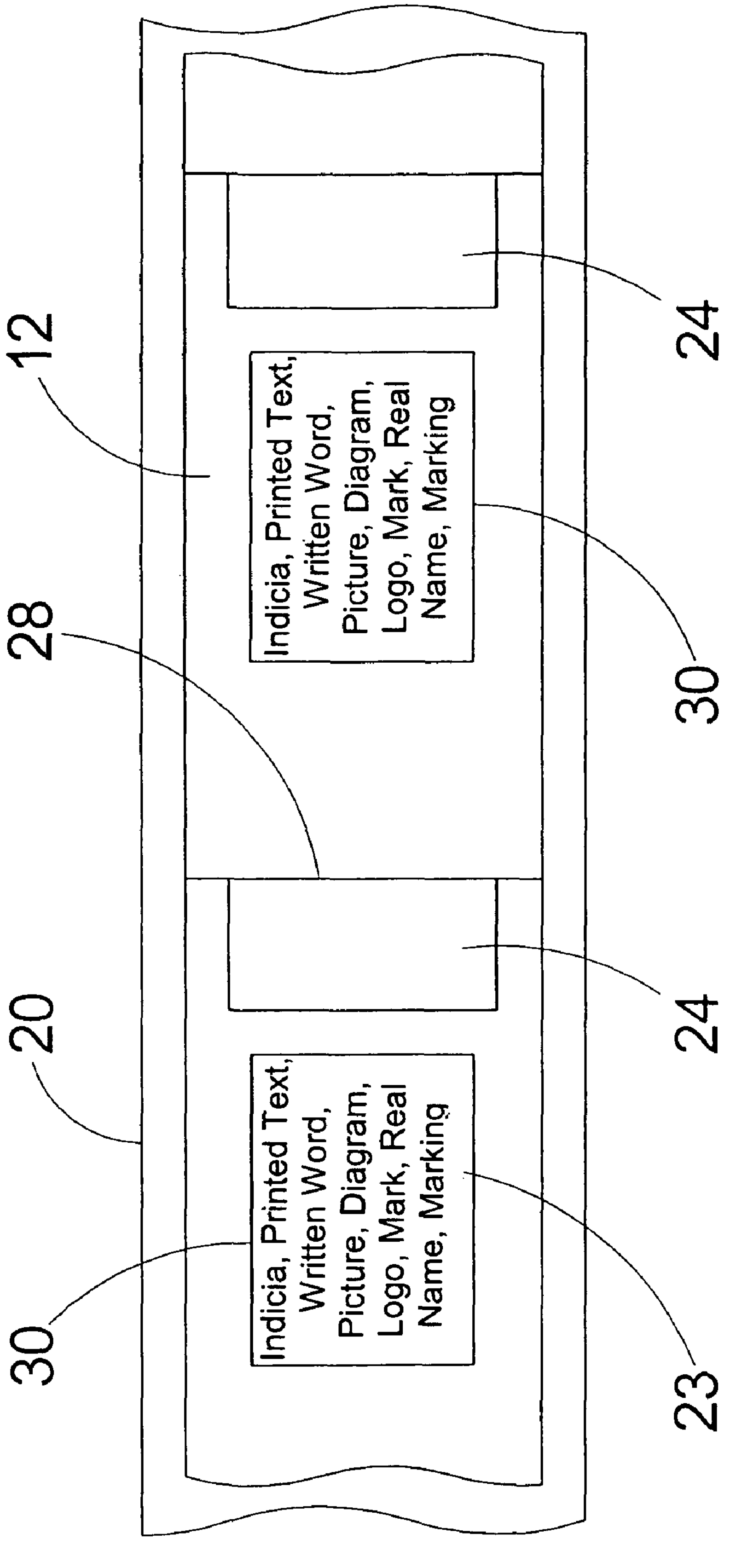
FIG. 5 is a schematic front view of a still yet further configuration (relative to FIG. 4) of the label structure being formed according to the present invention.

In another aspect, the method of the invention includes cutting the base material 12 to form a first portion of a perimeter 26 of the label structure being formed (see FIG. 4). In various embodiments, step of cutting includes forming a cut 27 along a line that extends and is oriented substantially transverse to the longitudinal axis of the of the base material 12 and the liner 20 to form a first end edge 28 of the label structure 10 being formed. The cut 27 preferably extends across the base material 12 from a first one 18 of the side edges to a second one 19 of the side edges, although this is not critical as further trimming of the base material may cut away lateral side portions of the strip of base material. The first end edge 28 of the label structure 10 may thus include the first portion of the perimeter 26 of the label structure when finished. It should be recognized that the cutting of the base material 12 does not include penetration of the liner 20 such that the liner is severed by the cut, and that this cut may be achieved with a cutting die.

The line of the cut 27 forming the first end edge 28 may be positioned along one margin of the markable region 24 having the release material applied thereto, so that the markable region having the release is located along at least a portion of the first end. In various embodiments, the markable region 24 extends along an entirety of the cut 27 forming the first end edge 28, although this is not critical as further trimming of the base material 12 may alter the extent of the markable region along the first end edge 28.

As an optional aspect of the method of the invention, a leaflet 30 may be positioned on the strip of base material 12 (see FIG. 5), and may include placing the leaflet on the front face 14 of the base material. The leaflet 30 is preferably positioned over a portion of the non-markable region 25 of the front face 14. In some embodiments, the position of the leaflet 30 is spaced or otherwise separated from the markable region 24. The leaflet 30 may comprise a folded sheet of material, and may include a single sheet that is folded multiple times to form multiple pages, or may include multiple folded pages forming a booklet. The material of the sheet or sheets of the leaflet 30 may comprise paper or film.

Figure 6:
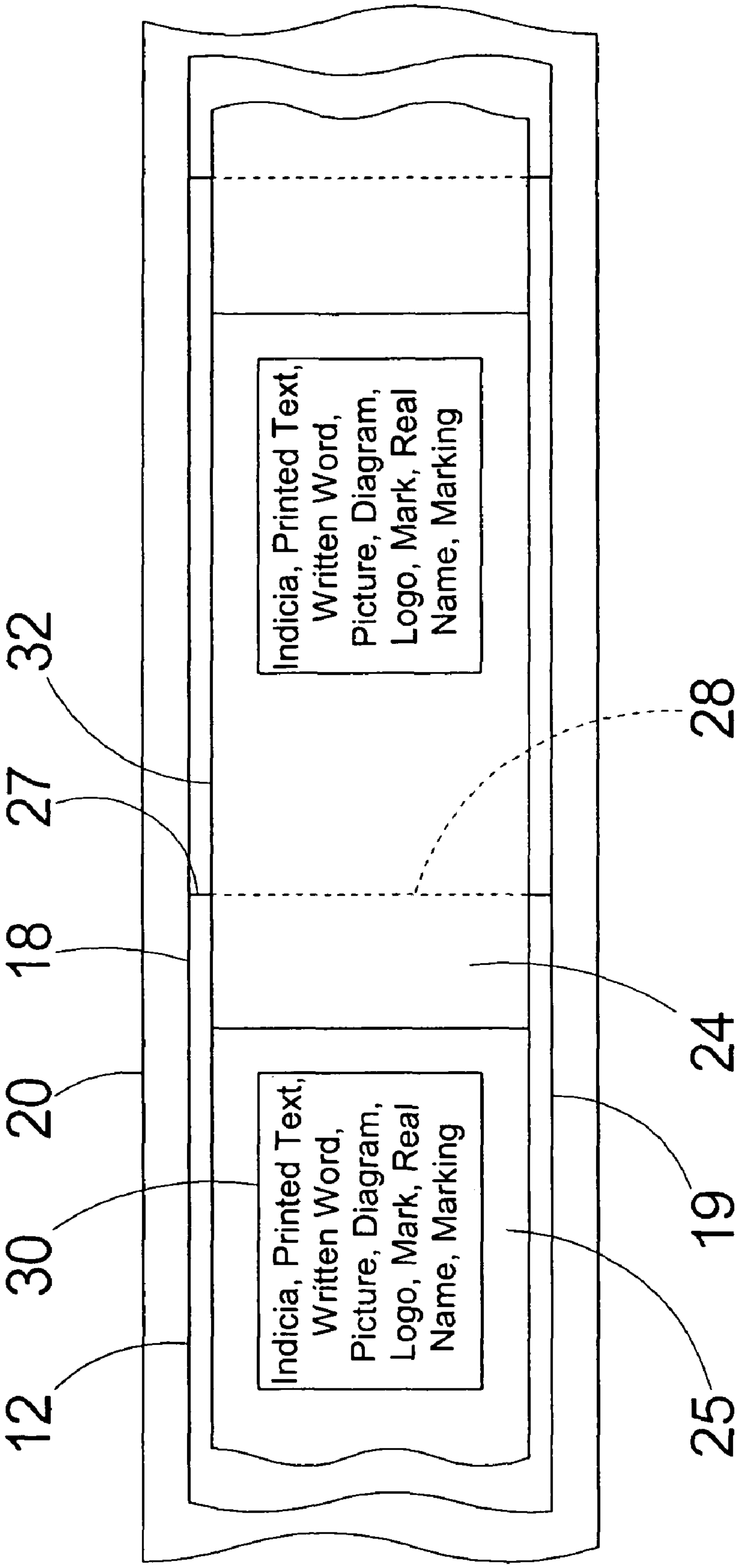
FIG. 6 is a schematic front view of a further configuration (relative to FIG. 5) of the label structure being formed according to the present invention.

A further aspect of the invention involves the positioning of a laminate material 32 over the front face 14 of the base material 12, and any leaflet 30 positioned thereon (see FIG. 6). In various embodiments of the invention, the laminate material 32 comprises a layer, such as a film, and the film may be adhered to the front face 14 as well as any leaflet 30 positioned adjacent to the front face 14. The adhesive adhering the laminating material 32 to the base material 12 is typically a more aggressive adhesive than the adhesive employed to releasably hold the base material 12 to the front surface 22 of the liner 20, and will generally resist separation of the laminate material and base material when adhered. It should be appreciated that, at this point in the process of the invention, the laminate material 32 extends over both the markable region 24 and the non-markable region 25 of the front face 14 of the base material 12.

The laminating material 32 is suitably transparent or translucent such that markings on the front face 14 (as well as any leaflet 30) are visible through the laminating material. It should be recognized that the laminate material 32 could comprise a coating that is applied in a flowable form to the surfaces of the base material 12 and any leaflet 30 present and that dries or sets up to a non-flowable condition.

Figure 7:
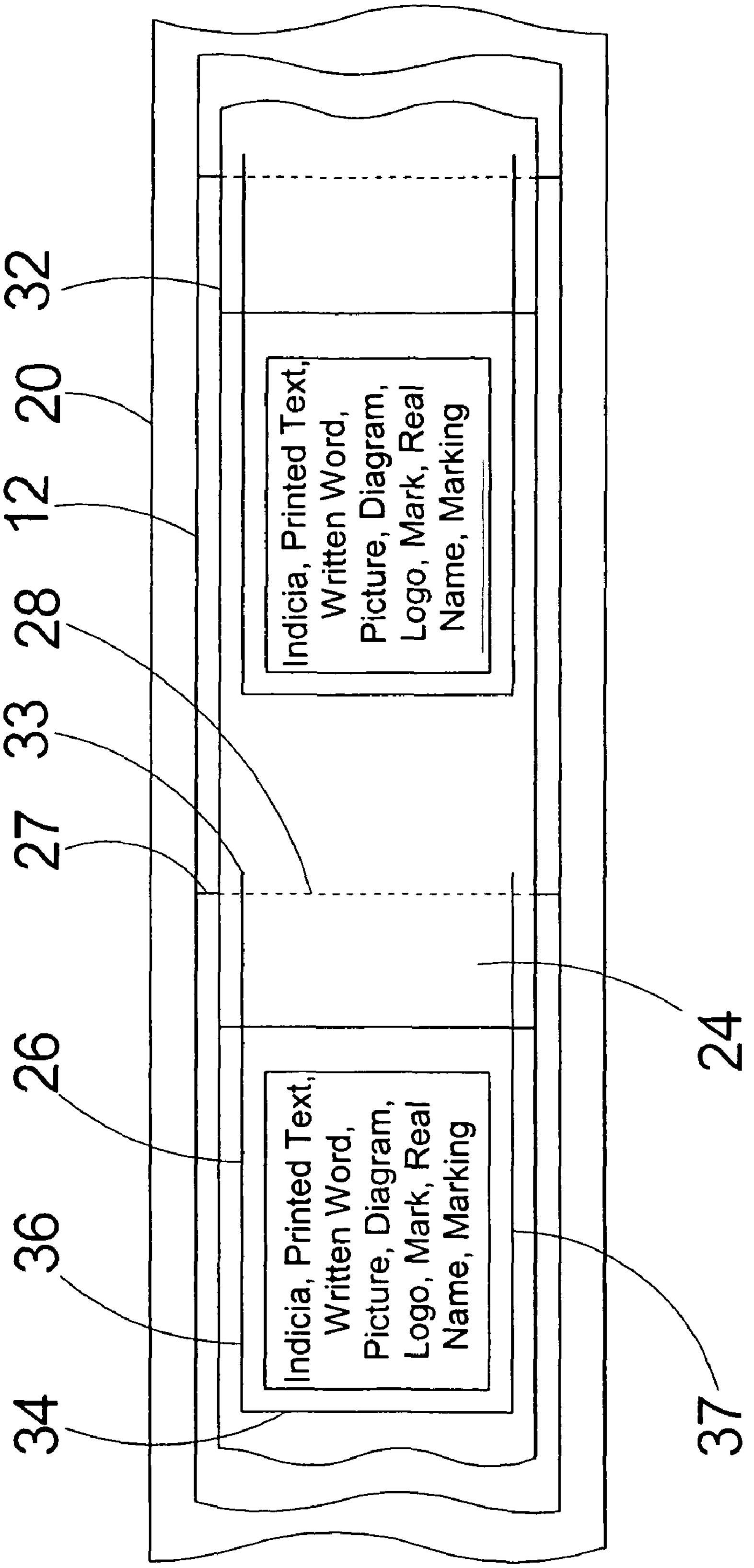
FIG. 7 is a schematic front view of a still further configuration (relative to FIG. 6) of the label structure being formed according to the present invention.

Upon application of the laminate material 32, the base material 12 and the laminate material are cut to form a second portion of the perimeter 26 of the label structure 10 being formed (see FIG. 7). The cut 33 may form a second end edge 34 of the label structure 10 being formed. In some embodiments of the invention, the cut 33 has a substantially U-shaped extent, and the cut also forms a pair of lateral side edges 36, 37 for the label structure 10 being formed that extend from the first end edge 28 to the second end edge 34, which may complete the perimeter 26 of the label structure 10. The cut 33 may intersect the cut 27, and may do so in two locations to complete the perimeter 26 of the label structure 10.

Figure 8:
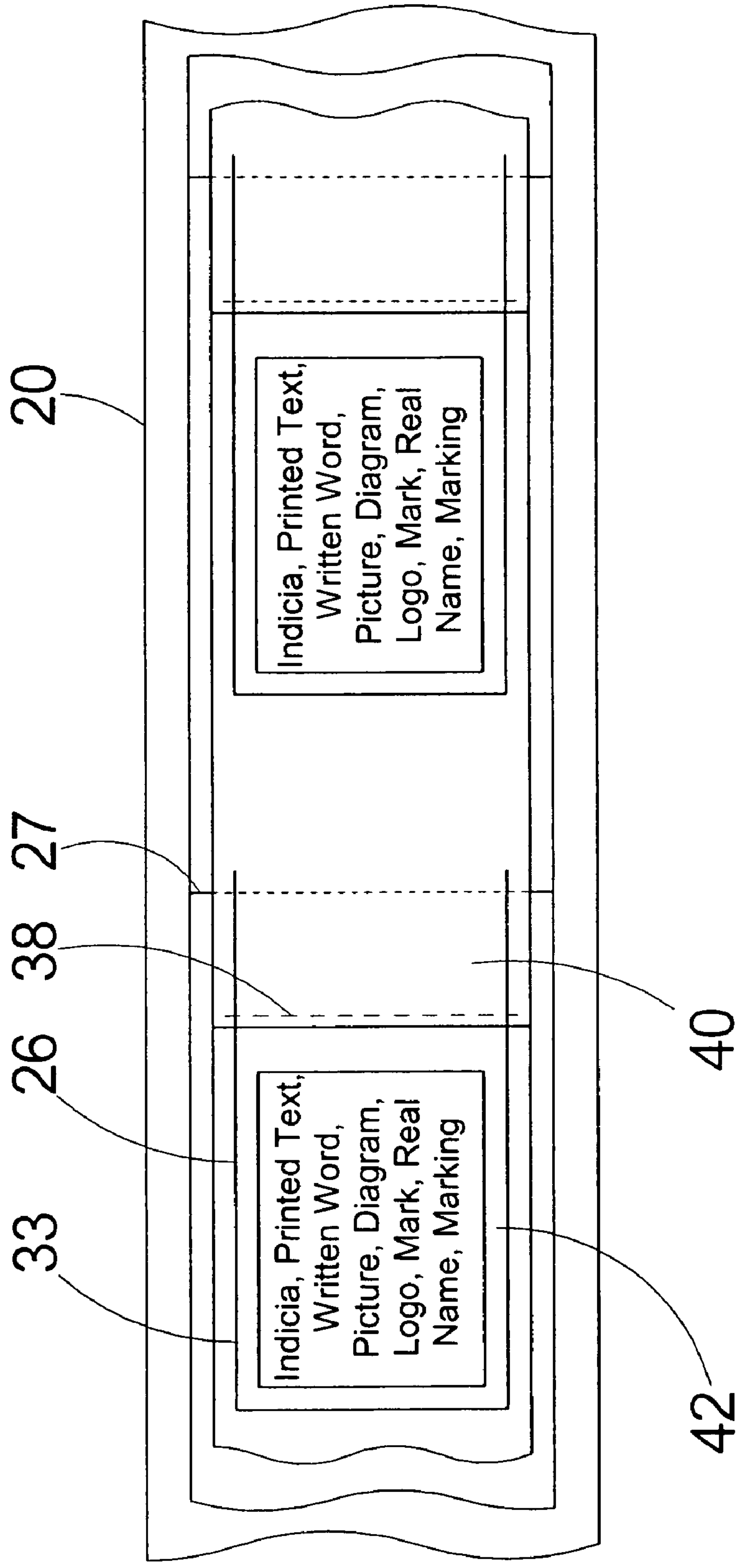
FIG. 8 is a schematic front view of a yet further configuration (relative to FIG. 7) of the label structure being formed according to the present invention.

Another aspect of the invention involves forming a cut 38 in the laminate material 32 along a line that is positioned substantially between the markable region 24 and the non-markable region 25 of the base material 12 (see FIG. 8). The cut 28 may intersect the cut 33 at two locations along the opposite side edges 36, 37 of the label structure. The laminate material 32 overlying the label structure 10 within the perimeter 26 may thus be separated into two pieces by the cut 38, with one piece 40 being adhered to the markable region 24 of the front face 14 of the base material 12 and the other piece 42 being adhered to the non-markable region 25 (as well as any leaflet 30 present).

Significantly, the cut 38 penetrates the laminate material 32 to the front face 14 of the base material 12, but does not penetrate or sever the base material. This selective cutting may be accomplished using a bi-level cutting die and may be performed as a part of the same step of the process in which the base material 12 (and the laminate 32) is cut along the second end edge 34 and the side edges 36, 37.

Figure 9:
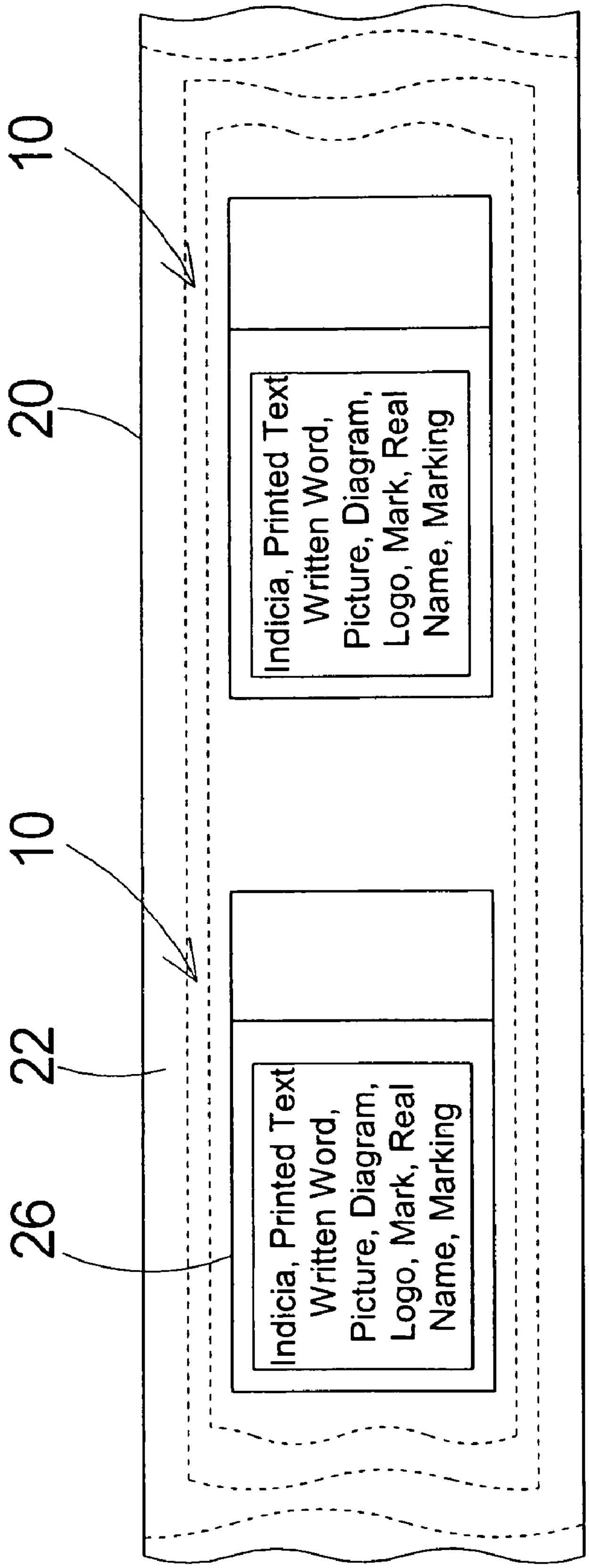
FIG. 9 is a schematic front view of a yet still further configuration (relative to FIG. 8) of the label structure being formed according to the present invention.
Figure 10:
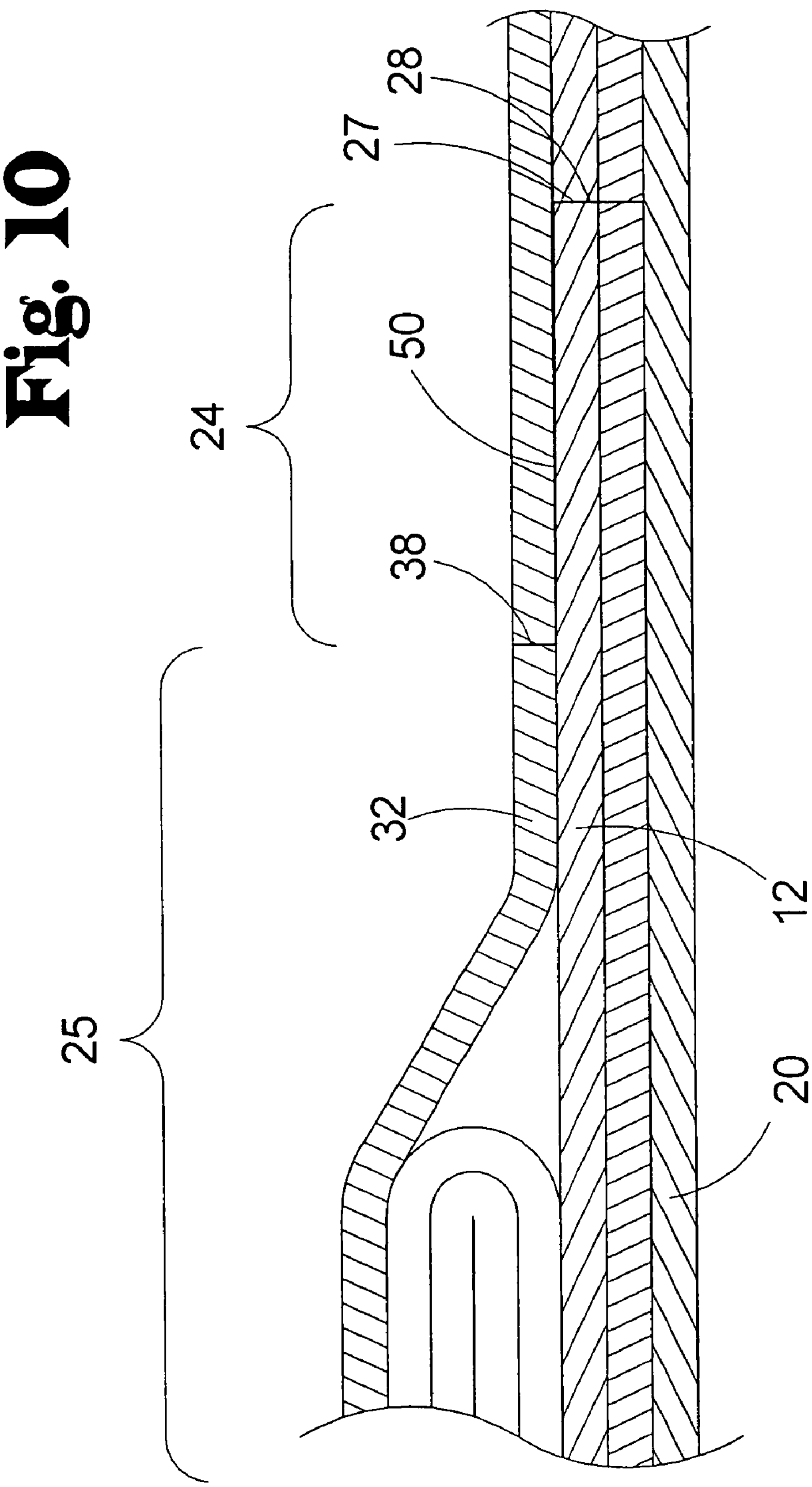
FIG. 10 is a schematic sectional view of the label structure of the present invention prior to the removal of the laminating material from the markable region.
Figure 11:
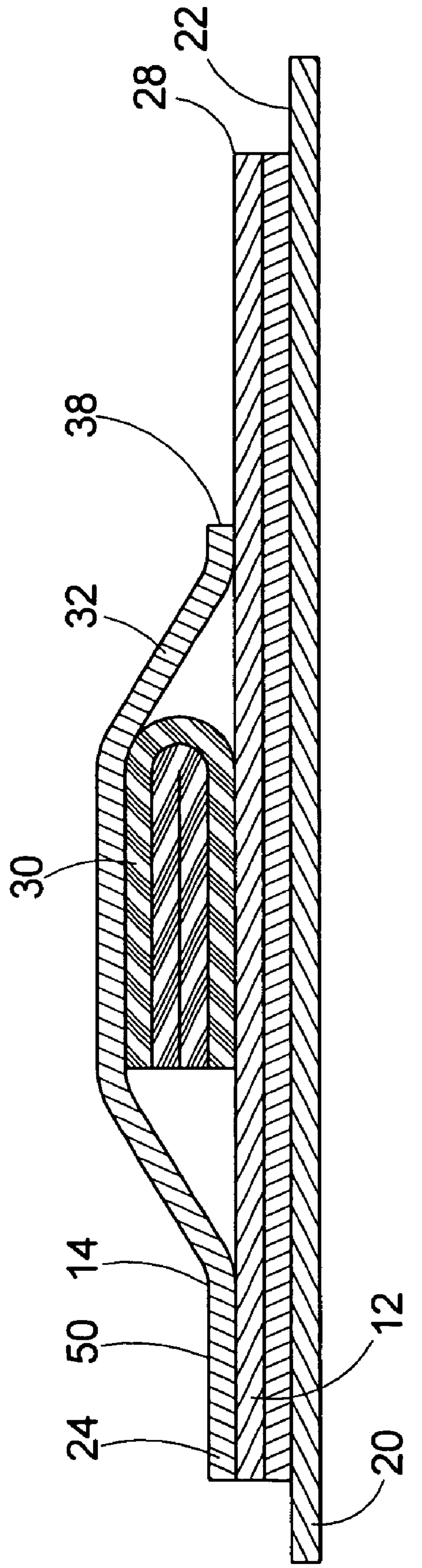
FIG. 11 is a schematic sectional view of the finished label structure of the present invention.

One of the final aspects of the method of the invention comprises peeling away (or otherwise removing) the portion or piece 40 of the laminate material 32 (that overlies the markable region 24 of the base material 12) from the base material, along with removal of the portion of the laminate material 32 lying outside the perimeter 26 of the label structure 10 (see FIG. 9). Peeling the laminate material 32 in a direction away from the liner 20 will also tend to peel the base material 12 located outside of the perimeter 26 from the liner with the laminate 32, due to the adhesive adhering the laminate 32 to the base material 12 being stronger and more aggressive than the adhesive adhering the base material 12 to the liner 20.

It should be appreciated that the portion or piece 40 of the laminate material 32 that overlies the markable region 24 is positioned between the first end edge 28 of the label structure 10 and the cut 38, but that the cut 27 through the base material 12 at the first end edge 28 does not extend though the overlying laminate material 32, as the cut 27 forming the first end edge was made prior to the application of the laminate 32. Thus, the portion or piece 42 of the laminate material 32 that overlies the markable region 24 is connected to the portion of the laminate material 32 that lies outside of the perimeter 26 of the label structure 10. As a result, peeling of the portion of the laminate material 32 that lies outside of the perimeter 26 will also peel the portion or piece 40 of the laminate material that overlies the markable region 24 away from the base material 12, which has the release material applied thereto to facilitate the peeling of the laminate material 32 from the base material at the markable region 24.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of producing a laminated label structure that includes a region that is markable after assembly of the label structure, comprising:

providing a strip of base material having a front face;

applying a release material to a markable region of the front face of the strip of base material for being marked after assembly of the label structure;

cutting the base material to form a first portion of a perimeter of the label structure being formed;

positioning a laminate material over at least a portion of the front face of the base material including the markable region;

cutting the base material and the laminate material to form a second portion of the perimeter of the label structure being formed;

cutting the laminate material substantially along a margin of the markable region of the front face without severing the base material; and peeling away from the base material a portion of the laminate material overlying the markable region of the front face of the base material.

2. The method of claim 1 wherein the step of peeling includes peeling away a portion of the laminate material located outside the perimeter of the label structure, the portion of the laminate material located outside the perimeter of the label structure being continuous with the portion of the laminate material overlying the markable region.

3. The method of claim 1 wherein the step of cutting the base material includes forming a first cut along a line to form a first end edge of the label structure being formed.

4. The method of claim 3 wherein the first cut is positioned along a margin of the markable region.

5. The method of claim 1 wherein the step of positioning the laminate material over the base material includes adhering the laminate material to the base panel including the markable region of the base panel.

6. The method of claim 1 wherein the step of cutting the base material and the laminate material to form the second portion of the perimeter of the label structure includes forming a substantially U-shaped cut.

7. The method of claim 1 wherein the step of cutting the base material includes forming a first cut along a line to form a first end edge of the label structure being formed;

wherein the step of cutting the base material and the laminate material to form the second portion of the perimeter of the label structure includes forming a substantially U-shaped second cut; and wherein the substantially U-shaped second cut forms a second end edge and a pair of side edges of the label structure being formed, the first cut intersecting the second cut at two locations to form a complete perimeter of the label structure.

8. The method of claim 1 wherein the step of cutting the laminate material without severing the base material and the step of cutting the base material and the laminate material are performed at substantially the same time.

9. The method of claim 1 wherein the step of cutting the base material is performed along a margin of the markable region of the base material.

10. The method of claim 1 wherein the step of cutting the laminate material without severing the base material is performed along a margin of the markable region.

11. The method of claim 1 wherein the step of cutting the base material is performed along a first margin of the markable region of the base material;

wherein the step of cutting the laminate material without severing the base material is performed along a second margin of the markable region; and wherein the second margin of the markable region is location substantially opposite of the first margin of the markable region.

12. The method of claim 1 additionally comprising the step of marking on the strip of base material prior to the step of positioning the laminate material.

13. The method of claim 1, wherein the step of providing the strip of base material includes providing a liner, the strip of base material having a rear face adhered to a front surface of the liner.

14. The method of claim 1 additionally comprising positioning a leaflet on the strip of base material.

15. The method of claim 14 wherein the step of positioning the laminate material over the base material includes applying the laminate material over the leaflet positioned on the front face of the base material.

16. The method of claim 1 wherein the step of peeling includes peeling away a portion of the laminate material located outside the perimeter of the label structure, the portion of the laminate material located outside the perimeter of the label structure being continuous with the portion of the laminate material overlying the markable region;

wherein the step of positioning the laminate material over the base material includes adhering the laminate material to base panel including the markable region;

wherein the step of cutting the base material and the laminate material to form the second portion of the perimeter of the label structure includes forming a substantially U-shaped cut;

wherein the substantially U-shaped cut forms a second end edge and a pair of side edges of the label structure being formed;

wherein the step of cutting the laminate material without severing the base material and the step of cutting the base material and the laminate material are performed at substantially the same time;

wherein the step of cutting the base material is performed along a first margin of the markable region of the base material;

wherein the step of cutting the laminate material without severing the base material is performed along a second margin of the markable region; and wherein the second margin of the markable region is location substantially opposite of the first margin of the markable region;

additionally comprising the step of marking on the strip of base material prior to the step of positioning the laminate material;

wherein the step of providing the strip of base material includes providing a liner, the strip of base material having a rear face adhered to a front surface of the liner;

additionally comprising positioning a leaflet on the strip of base material; and wherein the step of positioning the laminate material over the base material includes applying the laminate material over the leaflet positioned on the front face of the base material;

wherein the positioning of the laminate material over the front face includes positioning the laminate material over the cut forming the first portion of the perimeter of the label structure;

wherein the release material produces a surface with low adherability in the markable region on the front face;

wherein the release material comprises a coating selected from the group of coatings consisting of a release lacquer, a varnish, a silicone or an ink.

17. The method of claim 1 wherein the positioning of the laminate material over the front face includes positioning the laminate material over the cut forming the first portion of the perimeter of the label structure.

18. The method of claim 1 wherein the release material produces a surface with low adherability in the markable region on the front face.

19. The method of claim 1 wherein the release material comprises a coating selected from the group of coatings consisting of a release lacquer, a varnish, a silicone or an ink.

20. A method of producing a laminated label structure that includes a region that is markable after assembly of the label structure, comprising:

providing a strip of base material having a front face;

applying a low adhesion release material to a markable region of the front face of the strip of base material for being marked after assembly of the label structure;

first cutting the base material to form a first portion of a perimeter of the label structure being formed;

second adhering a laminate material to the front face of the base material including the markable region;

third cutting the base material and the laminate material to form a second portion of the perimeter of the label structure being formed;

fourth cutting the laminate material substantially along a margin of the markable region of the front face without severing the base material such that the portion of the laminate material located outside the perimeter of the label structure is continuous with the portion of the laminate material overlying the markable region inside the perimeter of the label structure; and peeling away from the base material the portion of the laminate material overlying the markable region by peeling away the portion of the laminate material located outside the perimeter of the label structure which is continuous with the portion overlying markable region.

* * * * *